US009062796B2

(12) United States Patent
Horsman et al.

(10) Patent No.: US 9,062,796 B2
(45) Date of Patent: Jun. 23, 2015

(54) FAUCET HANDLE ASSEMBLY

(71) Applicant: Masco Corporation of Indiana, Indianapolis, IN (US)

(72) Inventors: Steven Vincent Horsman, Fishers, IN (US); DeWayne Alan Davis, Lebanon, IN (US); Patrick B. Jonte, Zionsville, IN (US)

(73) Assignee: Delta Faucet Company, Indianapolis, IN (US)

( * ) Notice: Subject to any disclaimer, the term of this patent is extended or adjusted under 35 U.S.C. 154(b) by 212 days.

(21) Appl. No.: 13/739,717

(22) Filed: Jan. 11, 2013

(65) Prior Publication Data
US 2014/0197343 A1 Jul. 17, 2014

(51) Int. Cl.
*F16K 27/00* (2006.01)
*F16K 31/60* (2006.01)

(52) U.S. Cl.
CPC ............... *F16K 31/602* (2013.01); *Y10T 16/44* (2015.01)

(58) Field of Classification Search
CPC ......... E03C 1/0401; E03C 1/04; E03C 1/042; F16K 31/602; F16K 31/605; Y10T 16/44; Y10T 16/444
USPC ............... 251/288, 323, 208, 304; 137/12.17, 137/15.18, 315.12, 315.15, 359, 801, 269; 16/441, 436, DIG. 30; 4/678, 695; 74/553–548; 411/190
See application file for complete search history.

(56) References Cited

U.S. PATENT DOCUMENTS

| 3,929,317 | A | 12/1975 | Cohn et al. |
| 5,135,022 | A | 8/1992 | Kovey et al. |
| 5,257,645 | A | 11/1993 | Scully et al. |
| 5,329,967 | A | 7/1994 | Gnauert |
| 5,337,450 | A | 8/1994 | Martin |
| 5,438,730 | A | 8/1995 | Hansen, III |
| 5,826,788 | A | 10/1998 | Redding |
| 5,852,848 | A | 12/1998 | Spurgeon |
| 5,947,149 | A | 9/1999 | Mark |
| 6,098,660 | A | 8/2000 | Hansen |
| 6,279,604 | B1 | 8/2001 | Korb et al. |
| 6,345,643 | B1 * | 2/2002 | Ko ........................... 137/315.12 |
| 6,438,771 | B1 | 8/2002 | Donath, Jr. et al. |
| 6,484,753 | B1 | 11/2002 | Shimizu et al. |
| 6,666,227 | B2 | 12/2003 | Erickson |
| 6,807,983 | B1 | 10/2004 | Erickson |
| 6,854,920 | B2 | 2/2005 | Romero |
| 6,874,758 | B2 | 4/2005 | Heimann et al. |
| 6,880,805 | B2 | 4/2005 | Ortega, Jr. et al. |
| 6,981,286 | B2 | 1/2006 | Sallick |
| 7,055,545 | B2 | 6/2006 | Mascari et al. |

(Continued)

FOREIGN PATENT DOCUMENTS

CN 101680569 3/2010
EP 1 004 710 5/2000

*Primary Examiner* — Marina Tietjen
(74) *Attorney, Agent, or Firm* — Faegre Baker Daniels LLP

(57) ABSTRACT

A faucet handle assembly includes a handle having a user input portion and a shaft extending axially downwardly from the user input portion. A hub includes a side wall defining an internal chamber extending between an open upper end and an open lower end, the open upper end rotatably receiving the shaft of the handle. A push nut retains the shaft of the handle to the hub and is slidably adjustable along the shaft for axial positioning therealong. A mounting base is received within the internal chamber of the hub and secures the hub to a mounting deck.

21 Claims, 11 Drawing Sheets

(56) References Cited

U.S. PATENT DOCUMENTS

| | | |
|---|---|---|
| 7,066,204 B2 | 6/2006 | Marty |
| 7,331,358 B2 | 2/2008 | Gallina et al. |
| 7,409,968 B2 * | 8/2008 | Yang .................. 137/801 |
| 7,490,619 B2 | 2/2009 | Farag et al. |
| 7,509,971 B2 | 3/2009 | Kajuch |
| 7,658,202 B2 | 2/2010 | Mueller et al. |
| 7,886,763 B2 | 2/2011 | Smith et al. |
| 7,934,520 B2 | 5/2011 | Esche et al. |
| 7,987,869 B2 * | 8/2011 | Rosko et al. ........ 137/315.15 |
| 8,079,381 B2 | 12/2011 | Fischer et al. |
| 8,261,766 B1 * | 9/2012 | Huang .................. 137/359 |
| 2002/0124309 A1 | 9/2002 | Donath, Jr. et al. |
| 2006/0174946 A1 | 8/2006 | Kajuch |
| 2006/0180213 A1 | 8/2006 | Ko |
| 2008/0179559 A1 | 7/2008 | Kacik |
| 2008/0277611 A1 | 11/2008 | Esche et al. |
| 2009/0134350 A1 | 5/2009 | Ammunson |
| 2010/0200077 A1 * | 8/2010 | Chan et al. .............. 137/15.18 |
| 2010/0200081 A1 | 8/2010 | Fischer et al. |
| 2011/0079307 A1 | 4/2011 | Marty et al. |
| 2011/0220827 A1 | 9/2011 | Tortorello et al. |
| 2011/0259456 A1 | 10/2011 | Pinette et al. |
| 2012/0227843 A1 | 9/2012 | Thomas et al. |
| 2013/0213509 A1 | 8/2013 | Thomas |

* cited by examiner

FAUCET HANDLE ASSEMBLY

BACKGROUND AND SUMMARY OF THE DISCLOSURE

The present invention relates to a faucet handle assembly and, more particularly, to a faucet handle assembly that eliminates a conventional set screw for coupling a handle member to a valve stem.

Conventional faucet handle assemblies often utilize an externally visible fastener (e.g., a set screw) to secure a handle member (e.g., a lever or a knob) to a valve stem. The set screw may present an aesthetically unpleasant appearance, often requiring a button or cover to hide the set screw.

According to an illustrative embodiment of the present disclosure, a faucet handle assembly includes a handle having a user input portion and a shaft extending downwardly along a longitudinal axis from the user input portion. The shaft includes a shoulder defining a downwardly facing surface. A hub includes a side wall defining an internal chamber extending between an open upper end and an open lower end. The open upper end includes an upwardly facing surface. A lip within the internal chamber of the hub defines a downwardly facing surface. The shaft of the handle is received within the open upper end of the hub for rotation about the longitudinal axis. Retainer tabs extend inwardly from the side wall into the internal chamber proximate the open tower end. A push nut retains the shaft of the handle to the hub. The push nut includes an upper surface and is slidably adjustable along the shaft of the handle for axial positioning relative to the downwardly facing surface of the lip of the hub for accommodating tolerances between the handle and the hub. The upwardly and downwardly facing surfaces of the hub are captured between the downwardly facing surface of the shaft of the handle and the upper surface of the push nut.

An upper glide ring is positioned intermediate the shaft of the handle and the hub to define an upper bearing between the downwardly facing surface of the shoulder of the handle and the upwardly facing surface of the upper end of the hub. A lower glide ring is positioned intermediate the hub and the push nut to define a lower bearing between the downwardly facing surface of the lip of the hub and the upper surface of the push nut. A mounting base includes a support defining a central opening and arms positioned outwardly from the central opening and defining rotational lock channels to receive the retainer tabs of the hub. The hub is in an unlocked position when the tabs are positioned outside of the channels, and the hub is a locked position when the hub is rotated about the longitudinal axis from the unlocked position such that the tabs are received within the lock channels.

According to another illustrative embodiment of the present disclosure, a faucet handle assembly for coupling to a valve stem includes a handle having a user input portion and a shaft extending downwardly from the user input portion. The shaft includes a shoulder defining a downwardly facing surface. A hub includes a side wall defining an internal chamber extending between an open upper end and an open lower end. The open upper end includes an upwardly facing surface. The shaft of the handle is rotatably received within the open upper end of the hub. A push nut retains the shaft to the hub, and is slidably adjustable along the shaft of the handle for axial positioning relative to the downwardly facing surface of the shoulder of the handle for accommodating tolerances between the handle and the hub. A valve body includes an upper receiving member configured to receive a valve cartridge having a valve stem, and a mounting shank extending downwardly from the upper receiving member. A mounting base defines a central opening, wherein the mounting shank of the valve body extends through the central opening. A valve body orientation device angularly orients the valve body relative to the mounting base. A hub orientation device angularly orients the hub relative to the mounting base. A handle orientation device angularly orients the user input portion of the handle relative to the valve stem.

According to another illustrative embodiment of the present disclosure, a faucet handle assembly includes a handle having a user input portion and a shaft extending axially downwardly from the user input portion. The shaft includes a shoulder defining a downwardly facing contact surface hub includes aside wall defining an internal chamber extending between an open upper end and an open lower end. The open upper end includes an upwardly facing contact surface. A lip within the internal chamber of the hub defines a downwardly facing surface. The shaft of the handle is received within the open upper end. A push nut retains the shaft of the handle to the hub. The push nut includes an upper surface and is slidably adjustable along the shaft of the handle for axial positioning relative to the downwardly facing surface of the lip of the hub for accommodating tolerances between the handle and the hub. The upwardly and downwardly facing surfaces of the hub captured between the downwardly facing surface of the shaft of the handle and the upper surface of the push nut.

A valve body includes an upper receiving member configurative to receive a valve cartridge, and a mounting shank extends downwardly from the upper receiving member and includes a retaining lip. A mounting base is recessed within the chamber of the hub. The mounting base includes a support defining a center opening and a coupler extending upwardly from the base and cooperating with an inner surface of the side wall hub to secure the hub to the mounting base. The retaining lip of the mounting shank is supported by an upper surface of the mounting base.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments elected for description have been chosen to enable one skilled in the art to practice the invention.

Figure 1:
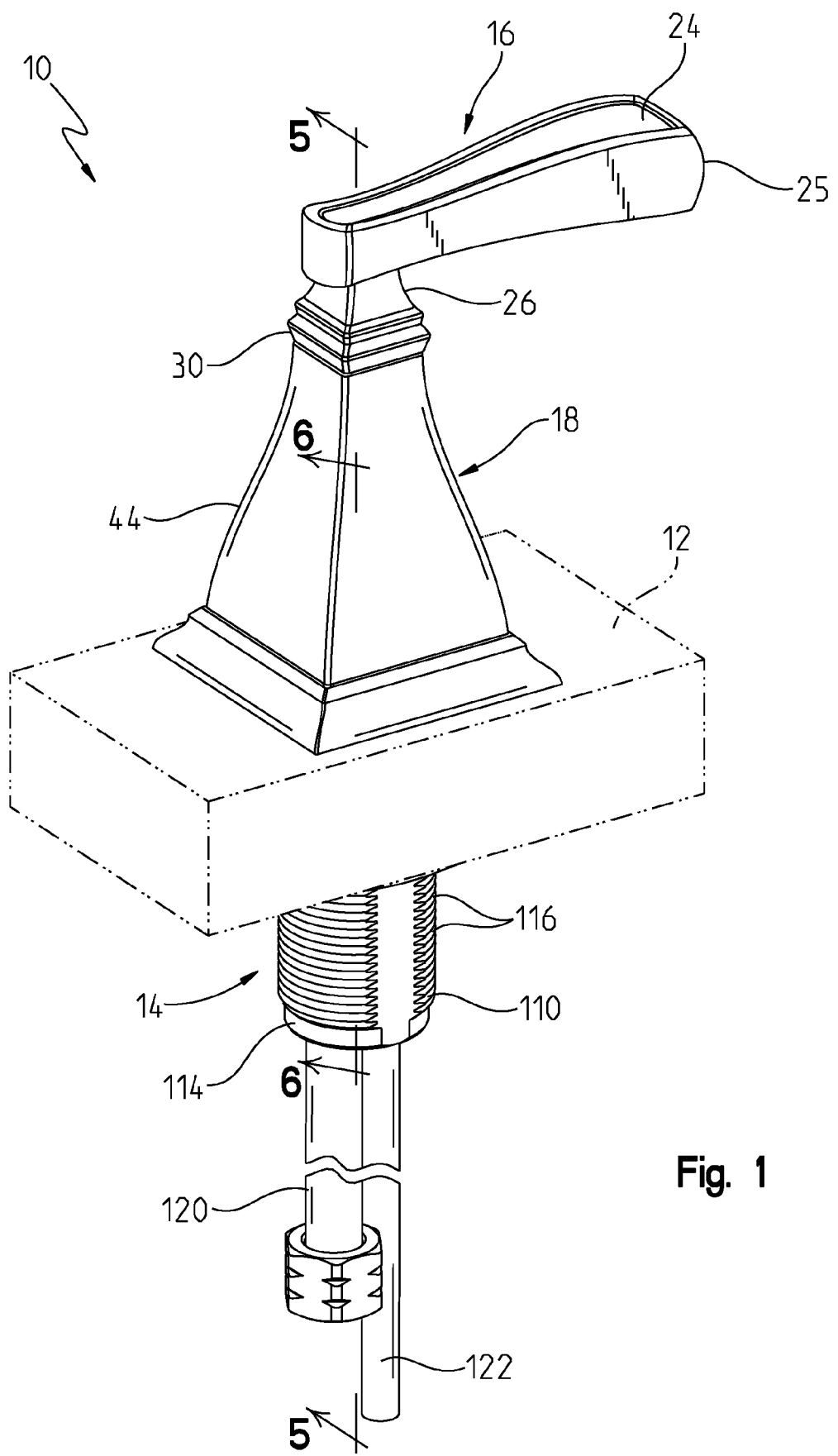
FIG. 1 is a perspective view of an illustrative faucet handle assembly of the present disclosure coupled to a valve body, with a mounting deck shown in phantom.
Figure 2:
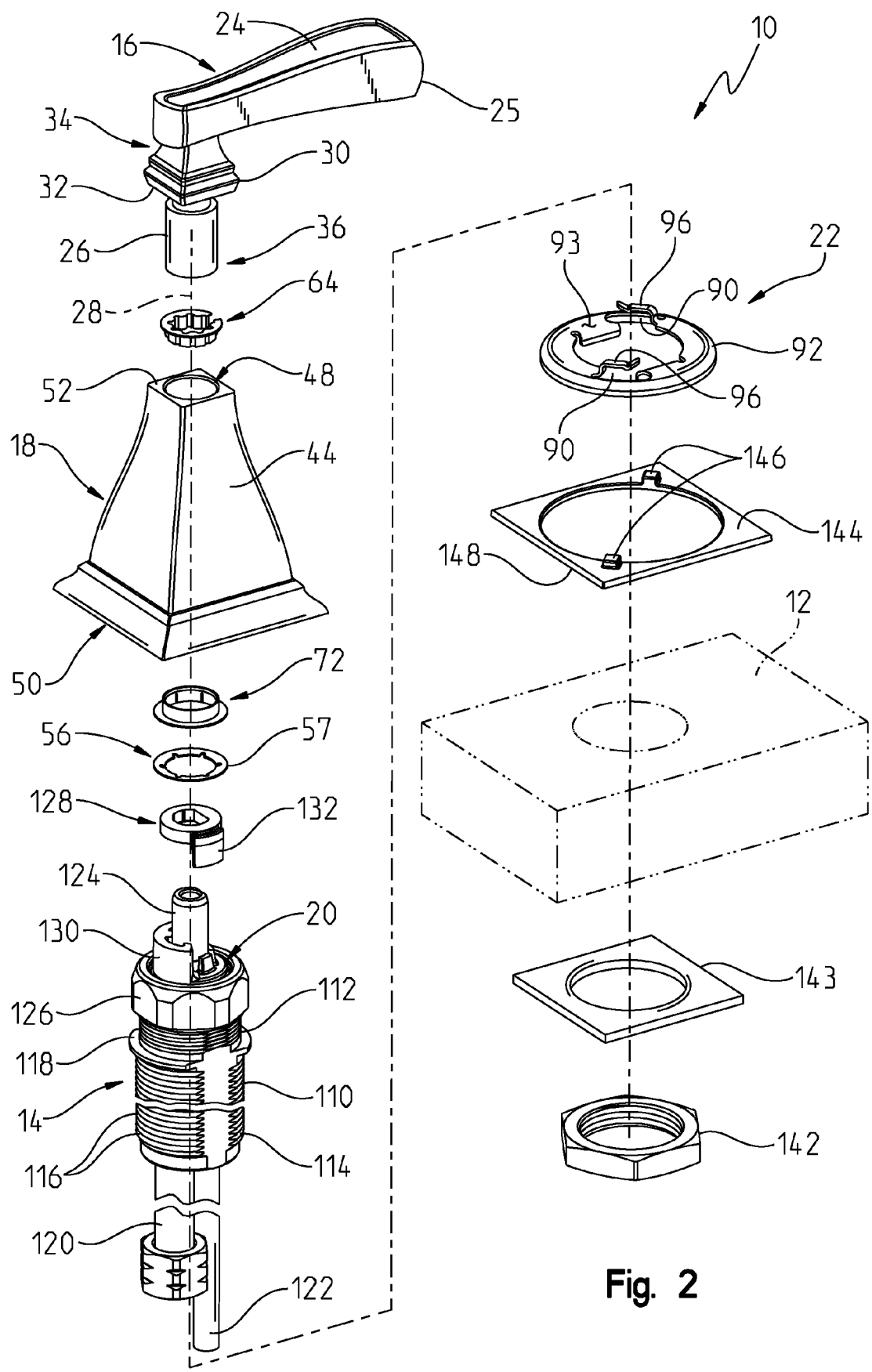
FIG. 2 is a top exploded perspective view of the faucet handle assembly and valve body of FIG. 1.
Figure 3:
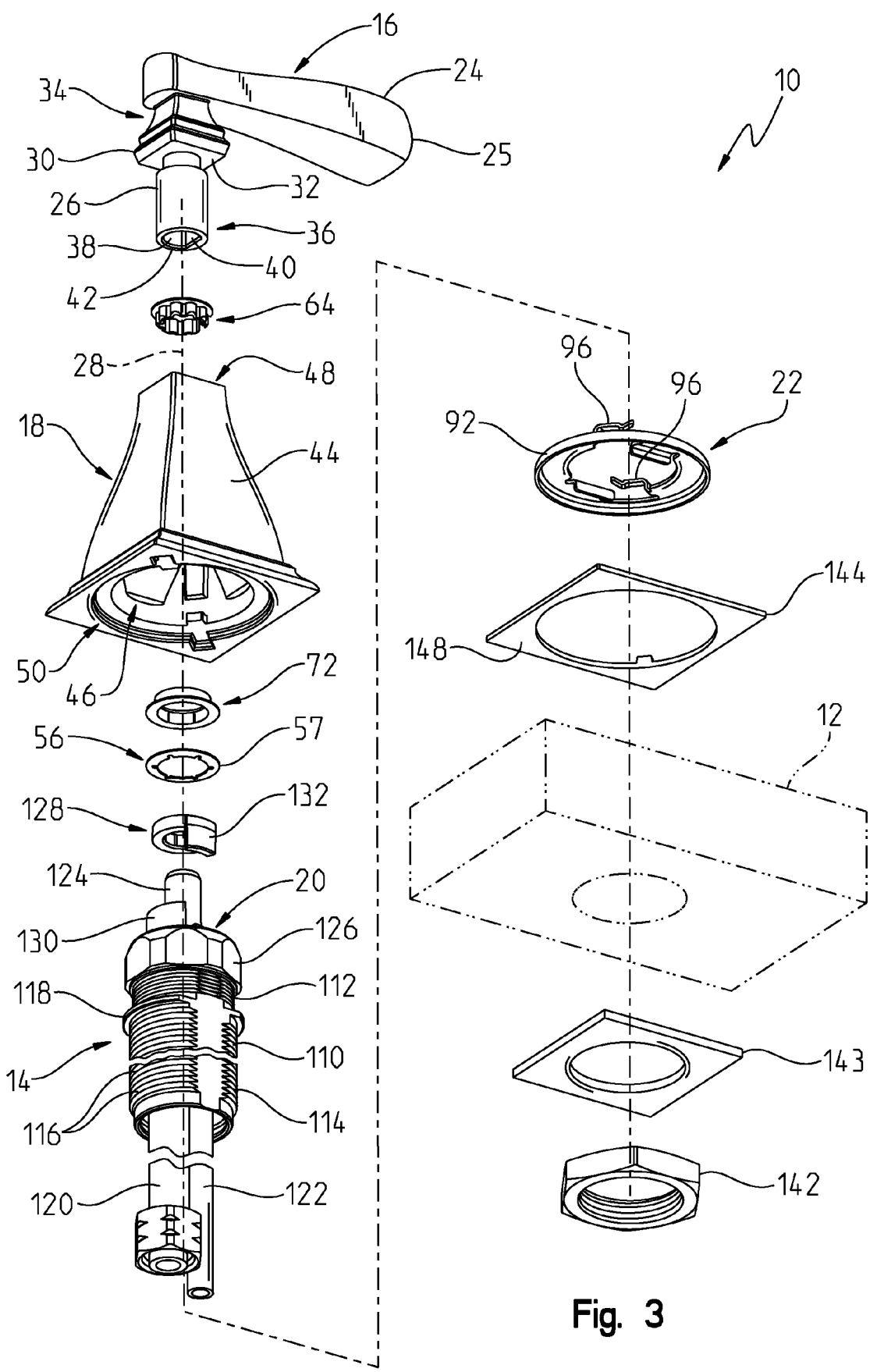
FIG. 3 is a bottom exploded perspective view of the faucet handle assembly and valve body of FIG. 1.

Referring initially to FIGS. 1-3, an illustrative faucet handle assembly 10 is configured to be coupled to a mounting deck 12, such as a sink deck, for controlling water flow through a valve assembly 14. The faucet handle assembly 10 illustratively includes a handle 16 rotatably supported by a hub 18. The handle 16 is operably coupled to a valve cartridge 20 of the valve assembly 14. The hub 18 is secured to a mounting base 22 which, in turn, in secured to the mounting deck 12.

The handle 16 illustratively includes a user input portion 24 and a shaft 26 extending axially downwardly from the user input portion 24. Illustratively, the user input portion 24 comprises a handle blade or lever 25 extending substantially perpendicular to the shaft 26. Alternatively, the user input portion 24 may comprise other user interfaces, such as a knob (not shown). The shaft 26 extends along a longitudinal axis 28 and includes a shoulder 30 defining a downwardly facing surface 32. An upper end 34 of shaft 26 is coupled to user input portion 24, while a lower end 36 of the shaft 26 includes an opening 38. The opening 38 illustratively includes a flat 40 and an arcuate wall 42, together defining a D-shaped cross-section (FIG. 3). In one illustrative embodiment, the handle 16 is integrally formed from a metal, such as a plated zinc alloy.

Figure 4:
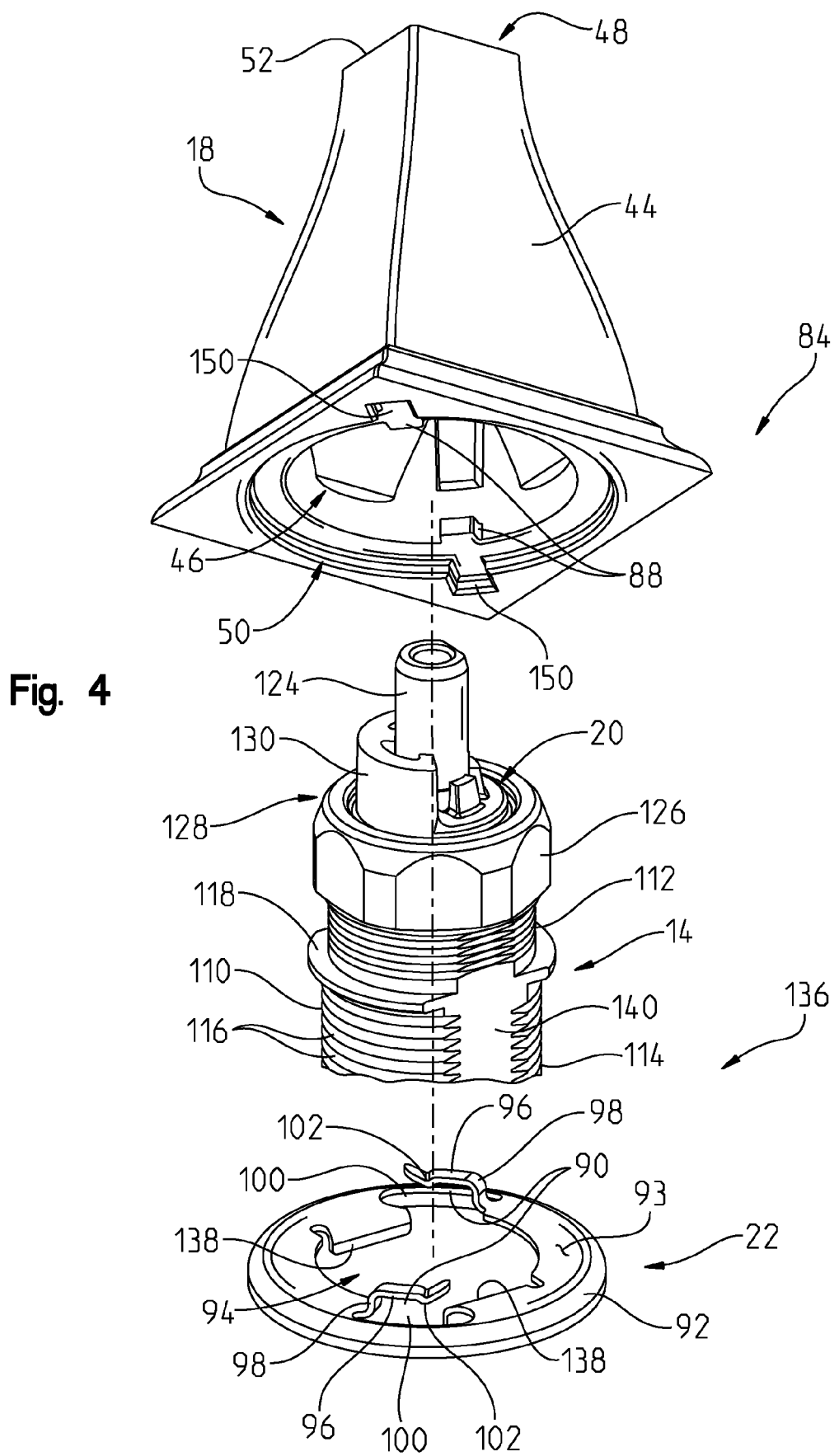
FIG. 4 is an exploded perspective view of the handle hub, valve body and mounting base of FIG. 1.
Figure 5:
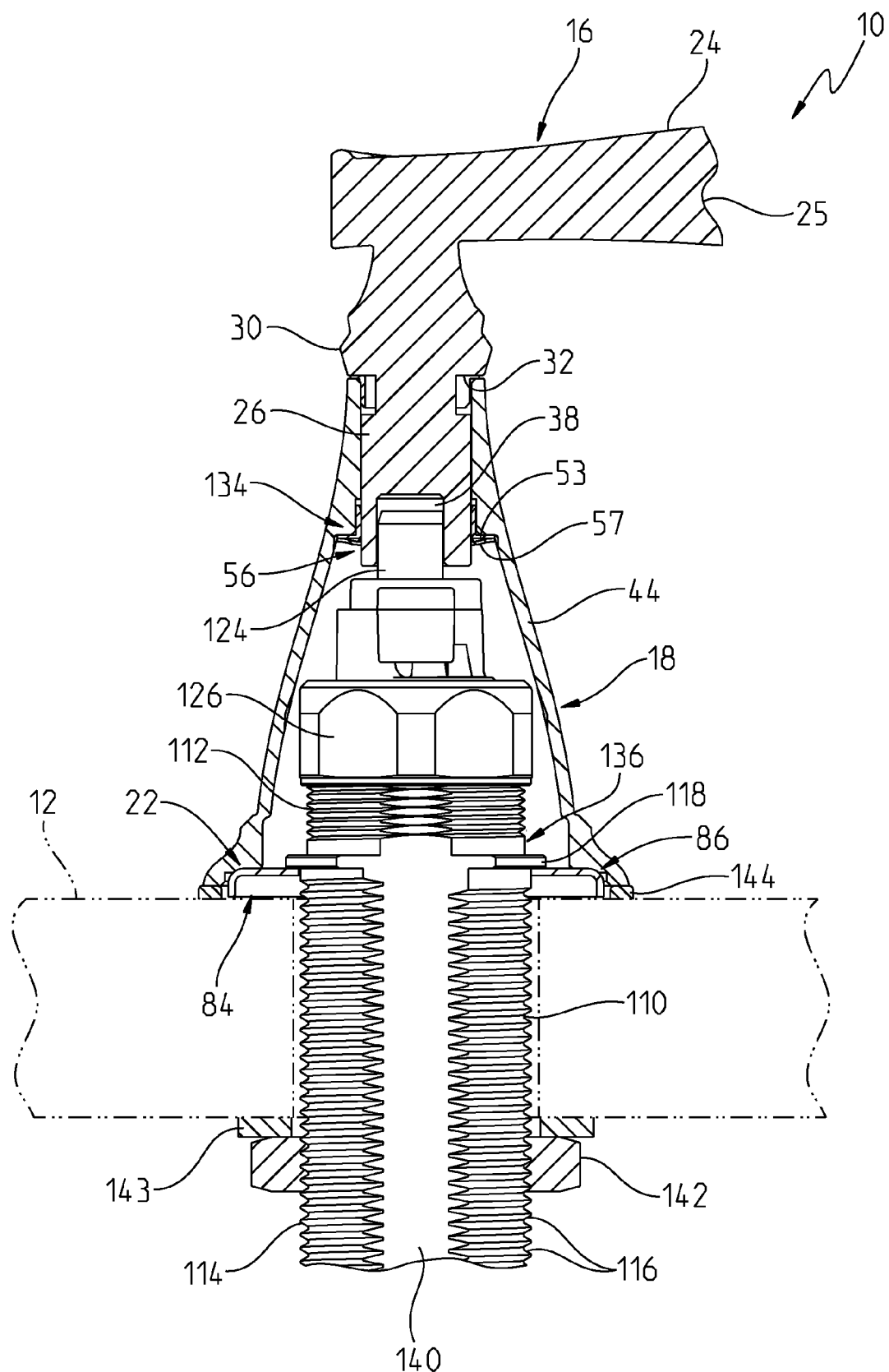
FIG. 5 is a cross-sectional view taken along line 5-5 of FIG. 1.
Figure 6:
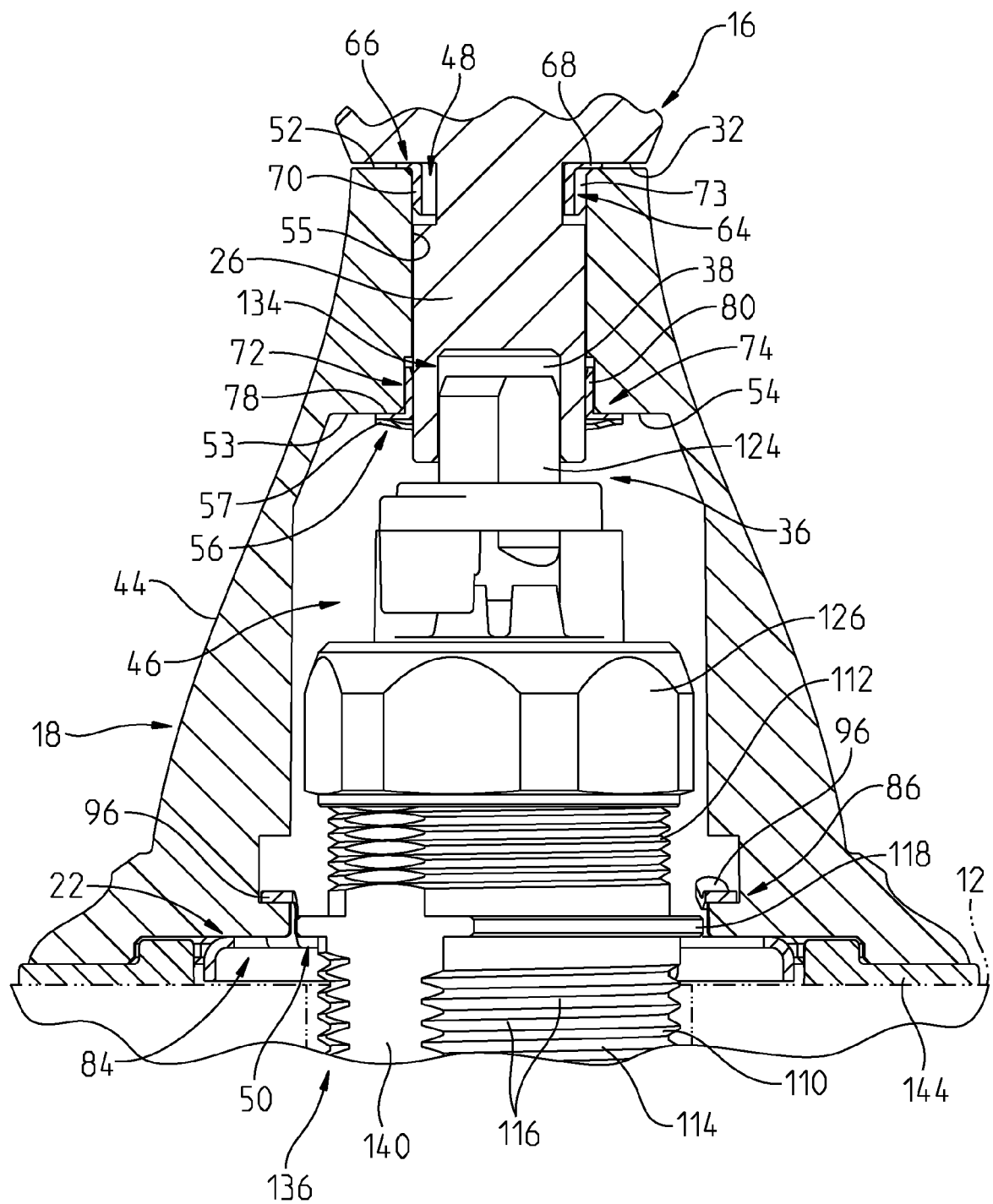
FIG. 6 is a cross-sectional view taken along line 6-6 of FIG. 1.

With respect to FIGS. 4-6, the hub 18 includes a side wall 44 defining an internal chamber 46 extending between open upper end 48 and an open lower end 50. In the illustrative embodiment, the side wall 44 is rectangular, and more particularly square, in lateral cross-section. The open upper end 48 includes an upwardly facing surface 52. A lip 53 is formed in the internal chamber 46 and defines a downwardly facing surface 54. An opening 55 extends between surfaces 52 and 54 for receiving shaft 26 of the handle 16. The shaft 26 is illustratively received within the open upper end 48 and axially restrained by an upper coupler 56. In one illustrative embodiment, the hub 18 is integrally formed from a metal, such as a plated zinc alloy.

Figure 7:
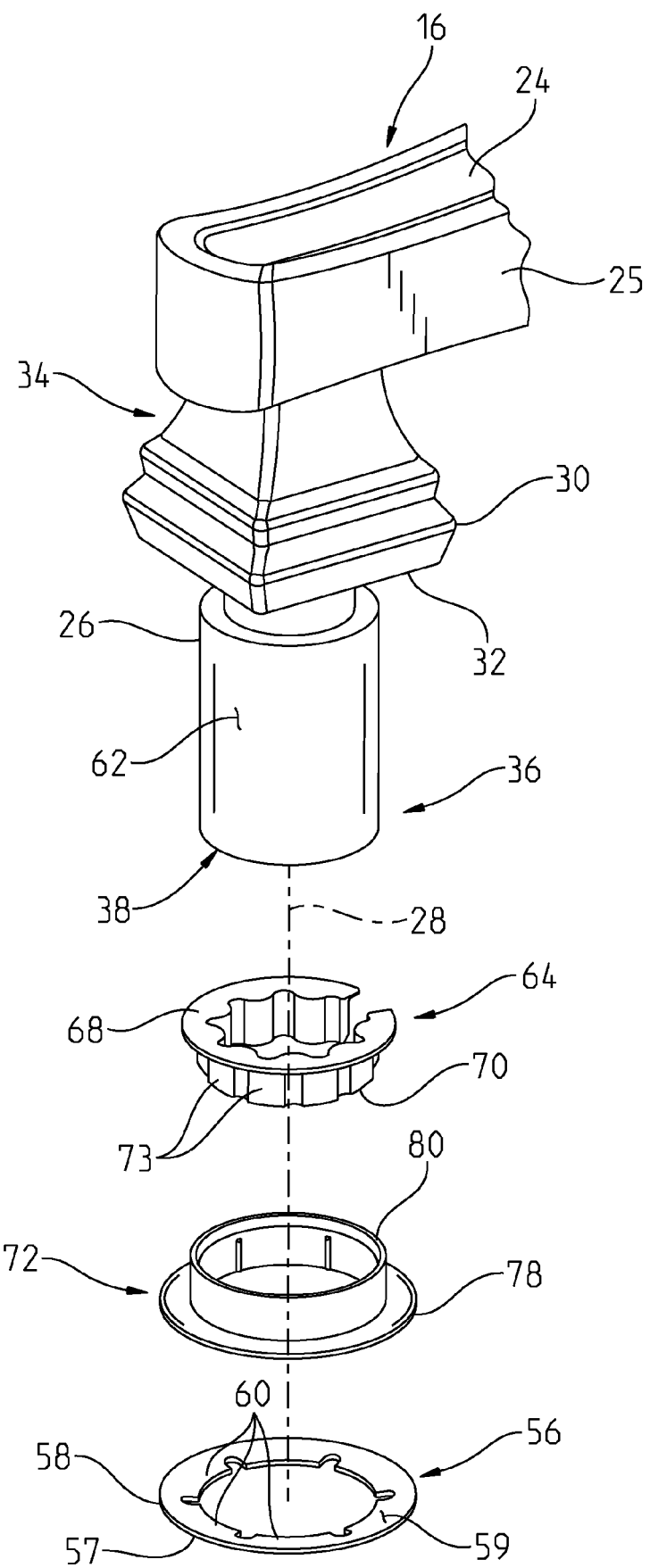
FIG. 7 is a detailed exploded perspective view of the of faucet handle blade mounting assembly of FIG. 1.
Figure 8:
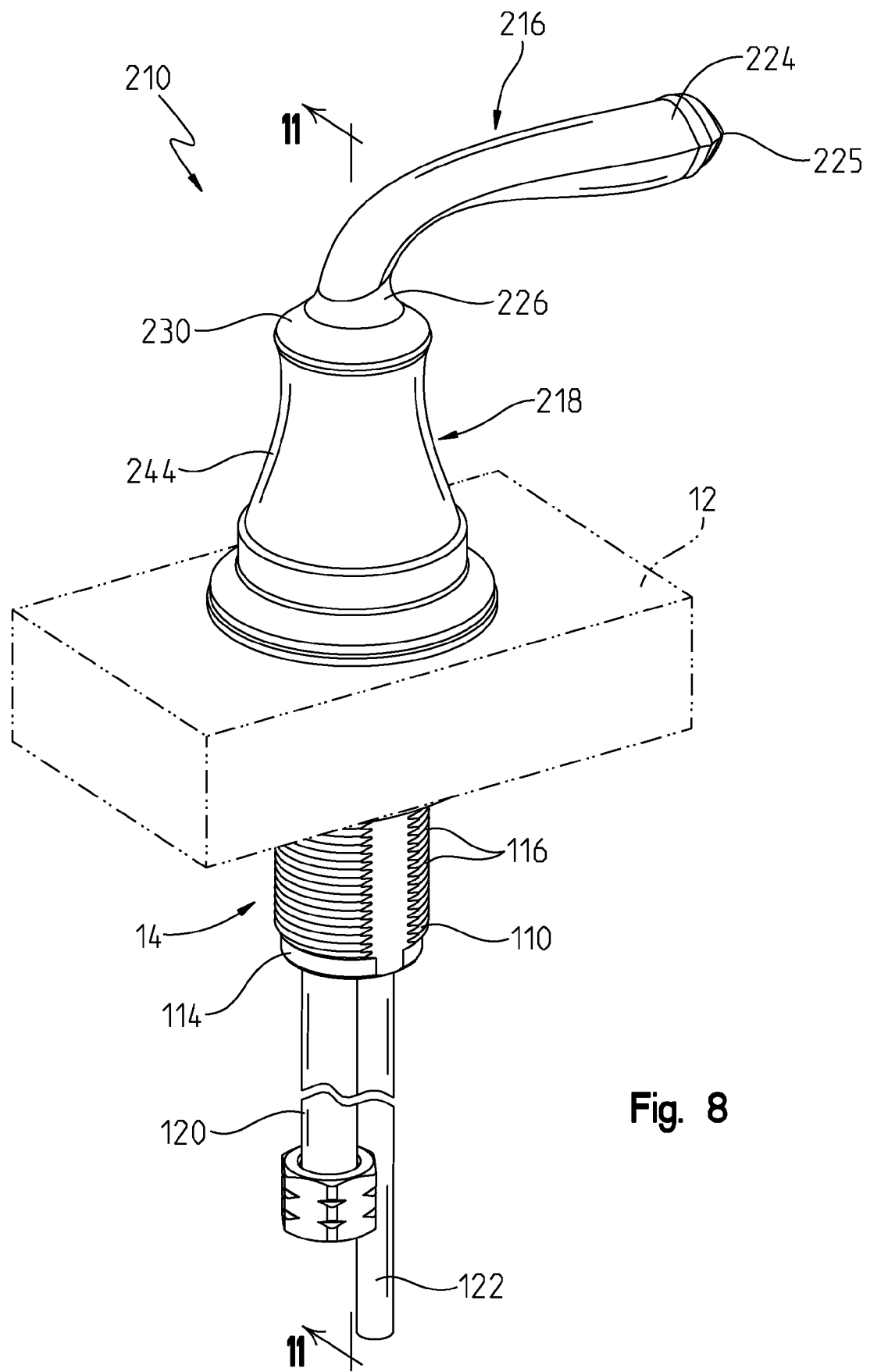
FIG. 8 is a perspective view of a further illustrative faucet handle assembly of the present disclosure coupled to a valve body, with a mounting deck shown in phantom.
Figure 9:
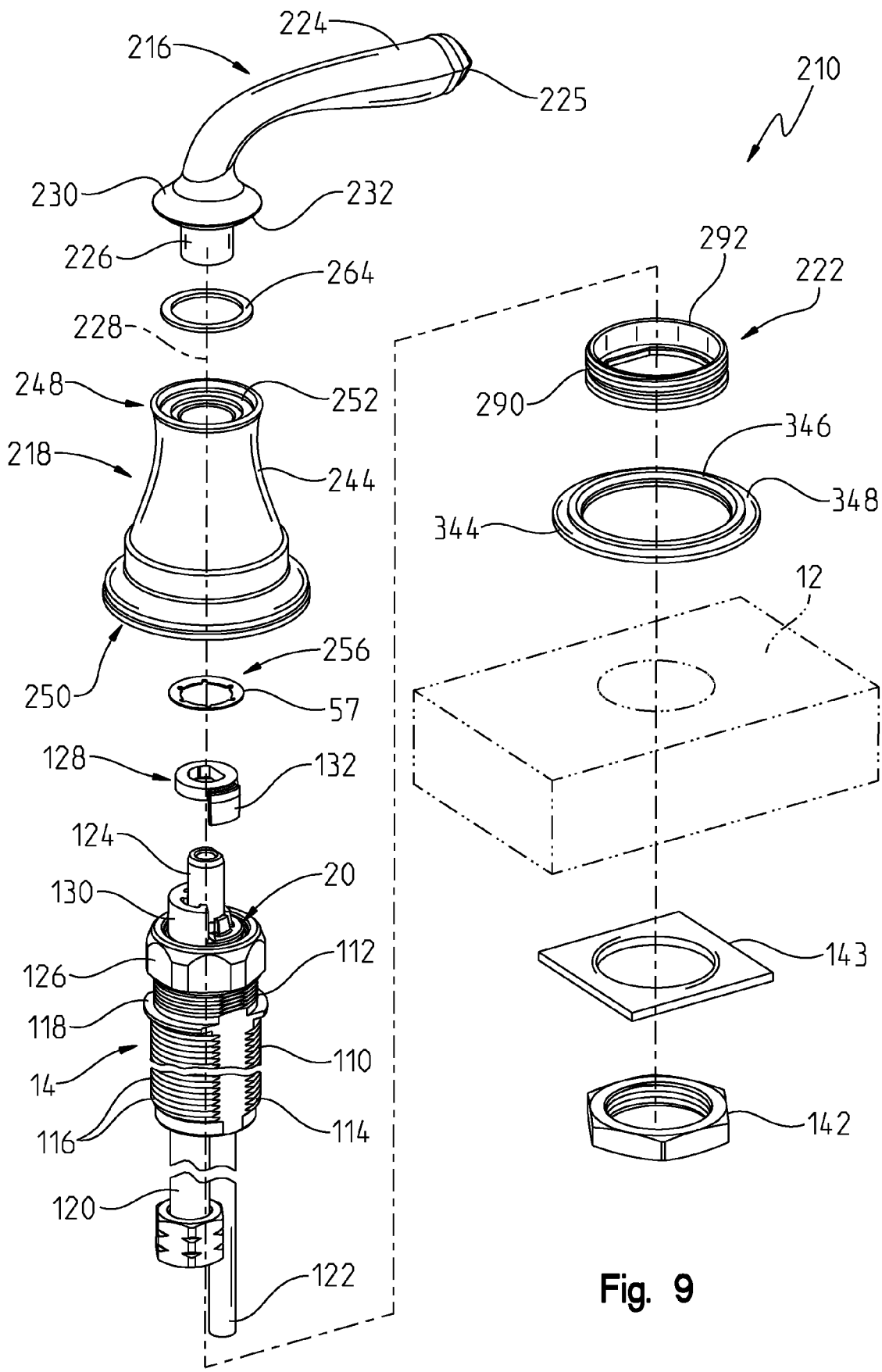
FIG. 9 is a top exploded perspective view of the handle assembly and valve body of FIG. 8.
Figure 10:
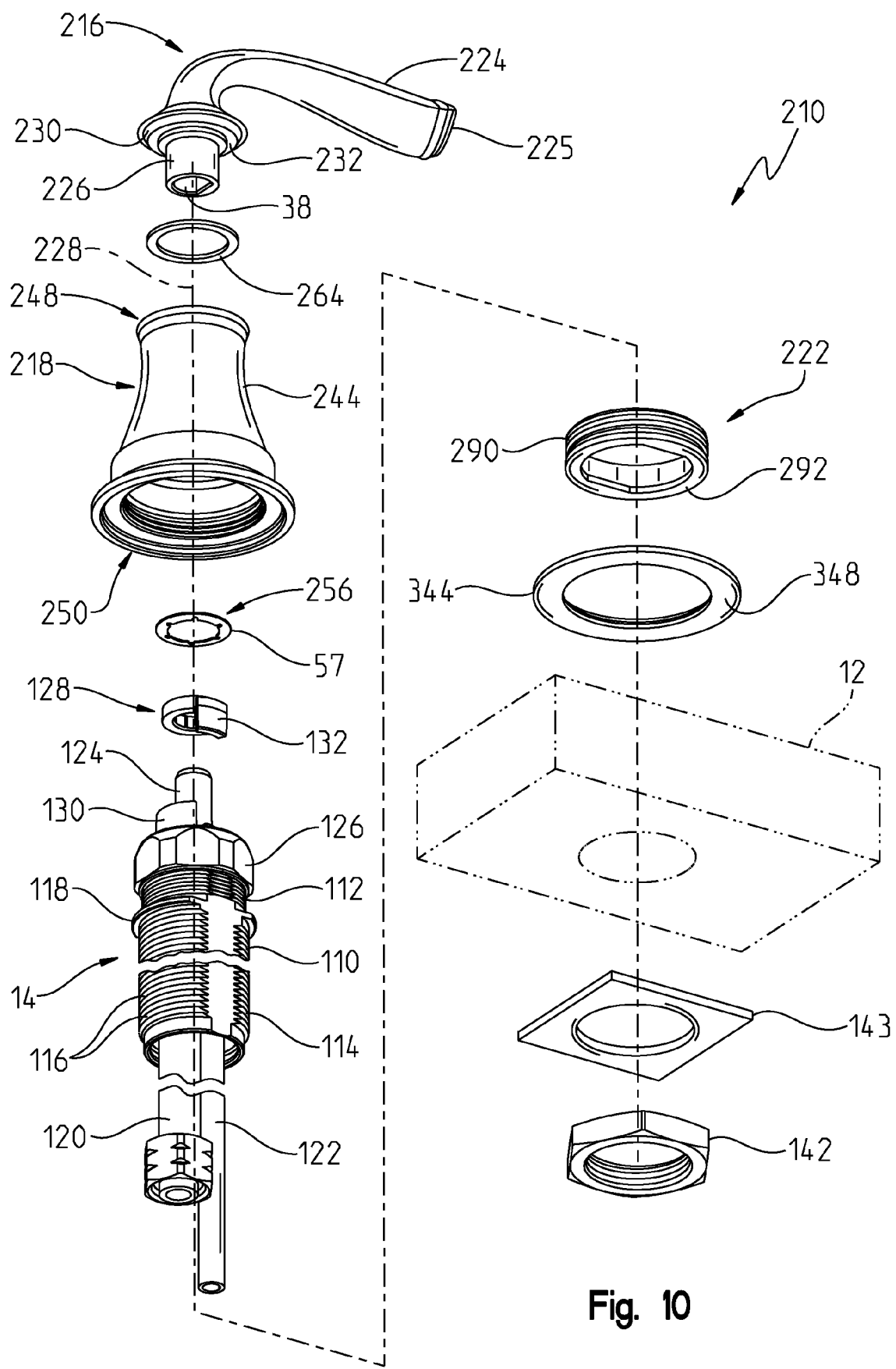
FIG. 10 is a bottom exploded perspective view of the handle assembly and valve body of FIG. 8.
Figure 11:
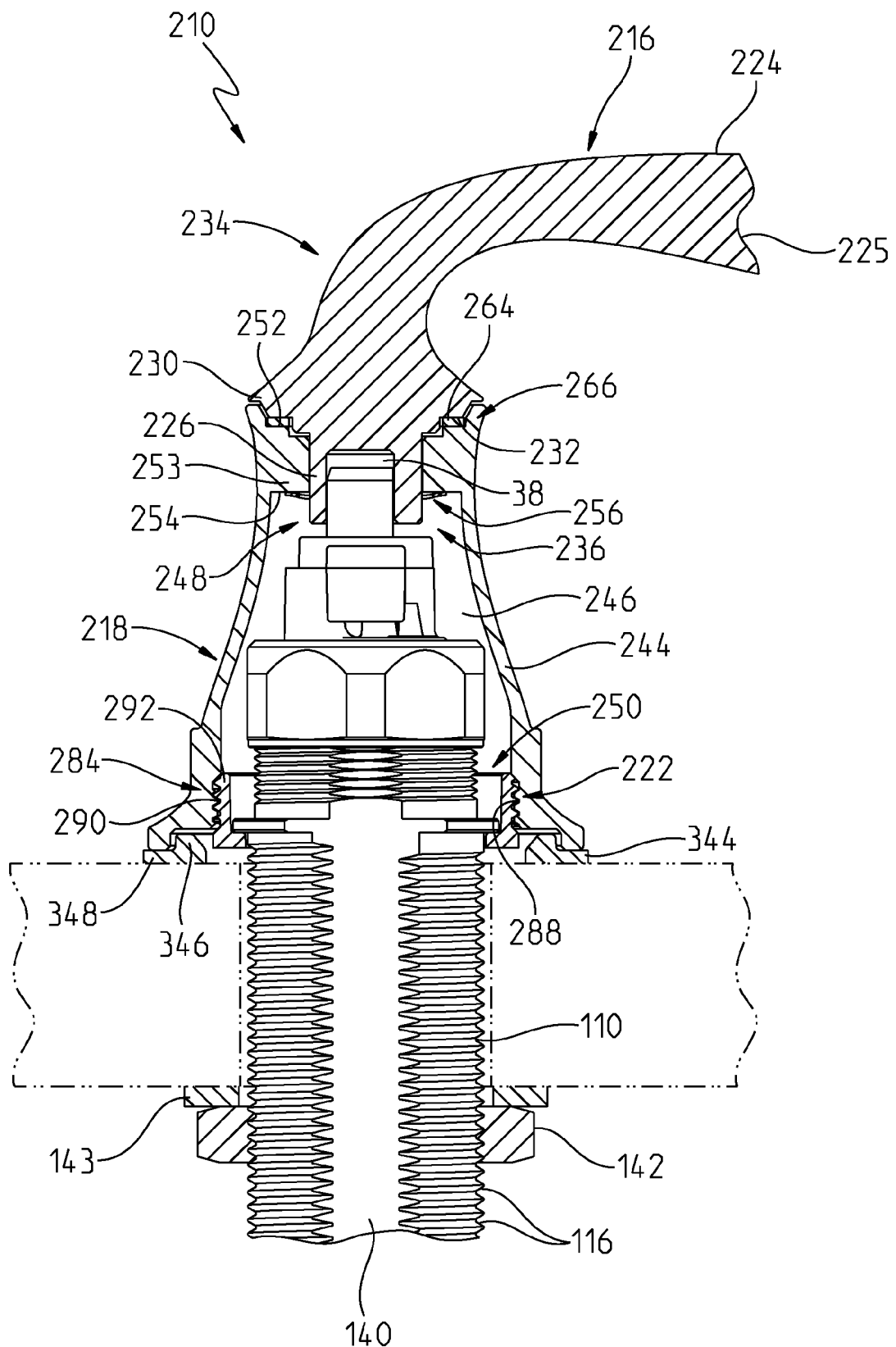
FIG. 11 is a cross-sectional view taken along line 11-11 of FIG. 8.

With respect to FIGS. 6 and 7, the upper coupler 56 illustratively includes a push nut 57 concentrically received on the lower end 36 of the shaft 26 to axially restrain the shaft 26 of the handle 16 while permitting rotation of the shaft 26 about longitudinal axis 28. The push nut 57 is slidably adjustable on the shaft 26 of the handle 16 for axial positioning relative to the downwardly facing surface 32 of the shoulder 30 of the handle 16, and the downwardly facing surface 54 of the lip 53 of the hub 18. Axial adjustability of the push nut 57 accommodates dimensional tolerances between the handle 16 and the hub 18. Illustratively, the push nut 57 is a conventional non-threaded fastener including an annular ring 58 having an upper surface 59, and a plurality of radially inwardly extending tangs 60 configured to frictionally engage the outer surface 62 of the handle shaft 26 (FIG. 7). The upwardly and downwardly facing surfaces 52 and 54 of the hub 18 are captured between the downwardly facing surface 32 of the handle shaft 26 and the upper surface 59 of the push nut 57 such that the handle shaft 26 is journaled for rotation within the opening 55 at the upper end of the hub 18.

An upper glide ring 64 is positioned intermediate the shoulder 30 of the handle shaft 26 and the hub 18 to define an upper bearing 66 between the upwardly fixing surface 52 of the hub 18 and the downwardly facing surface 32 of the handle 16. The glide ring 64 illustratively comprises a split friction ring including an upper flange 68 and a downwardly extending cylindrical wall 70. The wall 70 includes a plurality of radially outwardly extending ribs 73 configured to frictionally engage the opening 55 at the upper end 48 of the hub 18. The upper glide ring 64 is illustratively formed of a polymer, such as a polypropylene. A tower glide ring 72 is positioned intermediate the hub 18 and the push nut 57 to define a lower bearing 74 between the downwardly facing surface 54 of the hub 18 and the upper surface 59 of the push nut 57. The lower glide ring 72 illustratively includes a lower flange 78 and an upwardly extending cylindrical wall 80. The lower glide ring 72 is illustratively formed of a polymer, such as polyoxymethylene.

A lower coupler 84 includes a hub orientation device 86 and is configured to secure the hub 18 with the mounting base 22. The square cross-section of the hub 18 requires proper orientation relative to the mounting base 22 to provide proper aesthetics of the handle assembly 10 when coupled to the mounting deck 12. In the illustrative embodiment of FIG. 1-3, the lower coupler 84 is recessed within the internal chamber 46 of the hub 18. As shown in FIG. 4, the lower coupler 84 illustratively includes opposing retainer tabs 88 extending inwardly from the side wall 44 of the hub 18 and configured to cooperate with opposing rotational lock channels 90 defined by the mounting base 22.

With respect to FIG. 4, the mounting base 22 illustratively includes a support 92 having an upper surface 93 and defining a central opening 94 and opposing arms 96 positioned outwardly from the central opening 94 and defining rotational lock channels 90 to receive the retainer tabs 88 of the huh 18. Each arm 96 includes a first end having a connector 98 secured to the support 92, and a freely supported second end defining an opening 100. A detent 102, illustratively a bend formed within the arm 96, is positioned proximate the opening 100 at the second end of arm 96. The tabs 88 cooperated with the detents 102 to define a locked position. The hub is in an unlocked position when the tabs 88 are positioned outside of the channels 90. As the hub 18 is rotated clockwise by approximately 90 degrees, it is moved into a locked position such that the tabs 88 are received within the lock channels 90. As tabs 88 are positioned intermediate the detents 102 and the first end connector 98, the hub 18 is properly oriented relative to the mounting base 22. As such, the side wall 44 of the hub 18 is rotationally oriented on the mounting deck 12, In one illustrative embodiment, the mounting base 22 is formed of a stamped metal, such as stainless steel. In alternative embodiments, the mounting base 22 may be formed of other materials, such as a molded polymer. If a polymer is used for the mounting base 22, the arms 96 may be connected to the support 92 at opposing ends (similar to connector 98) to provide additional structural support.

The valve assembly 14 includes a valve body 110 having an upper receiving member 112 configured to receive the valve cartridge 20. A mounting shank 114 extends downwardly from the upper receiving member 112 and includes external threads 116 and a retaining tip 118. The retaining lip 118 is supported by an upper surface 93 of the mounting base 22. More particularly, the mounting shank 114 of valve body 110 may pass through central opening 94 and then stopped by retaining lip 118. The valve body 110 may be formed of a metal, such as brass.

Water conduits, illustratively water inlet tube 120 and water outlet tube 122, extend upwardly into the mounting shank 114 and are in fluid communication with the valve cartridge 20. The valve cartridge 20 may be of conventional design as including a valve member (not shown) driven in rotation by a valve stern 124 to control the flow of water from the inlet tube 120 to the outlet tube 122. More particularly, the handle 16 rotates the valve stem 124 to cause simultaneous rotation of the valve member. The valve stem 124 is illustratively D-shaped in lateral cross-section.

A bonnet nut 126 threadably engages the valve body 110 and secures the valve cartridge 20 within the receiving member 112. A rotational limit stop 128 limits rotation of the valve stem, illustratively to approximately 90 degrees (i.e., quarter turn). The limit stop 128 illustratively includes a first or stationary member 130 secured in position by the bonnet nut 126, and second or rotatable member 132 coupled to the valve stem 124 (FIGS. 2-4).

With respect to FIGS. 5 and 6, a handle orientation device 134 angularly orients the user input portion 24 of the handle 16 relative to the valve stem 124. The user input portion 24 of the handle 16 needs to be properly located relative to the valve stem 124 to correlate positioning of the handle 16 relative to desired water flow. More particularly, the handle orientation device 134 includes the D-shaped lower opening 38 of the shaft 26 cooperating with the D-shaped valve stem 124.

A valve body orientation device 136 angularly orients the valve body 110, and hence the valve cartridge 20, relative to the mounting base 22. The valve body orientation device 136 illustratively includes first orientation flats 138 supported by the mounting base 22 which cooperate with second orientation flats 140 supported by the mounting shank 114. Cooperation or alignment between the first and second orientation flats 138 and 140 angularly orients the valve body 110 to the mounting base 22. A mounting nut 142 engages the external threads 116 of the mounting shank 114 to secure the valve body 110 to a mounting deck 12. More particularly, the mounting deck 12 and the mounting base 22 are clamped between the retaining lip 118 of the valve body 110 and the mounting nut 142. A washer 143 may be positioned between the mounting nut 142 and a lower surface of the mounting deck 12.

A gasket 144 is positioned axially intermediate the hub 18 and the mounting base 22, and extends radially around the outside of the mounting base 22. The gasket 144 is illustratively formed of a polymer and is configured to resist possible corrosion between the zinc of the hub 18 and the mounting deck 12. The gasket 144 includes locating tabs 146 extending upwardly from abuse 148 and configured to be received within corresponding recesses 150 formed in the bottom of the hub 18 (FIG. 4).

With reference now to FIGS. 8-11, a further illustrative embodiment faucet handle assembly 210 is shown. Faucet handle assembly 210 includes many similar elements to faucet handle assembly 10. As such, similar components will be identified in the following description with like reference numbers.

The faucet handle assembly 210 includes a handle 216 illustratively including a user input portion 224 and a shaft 226 extending axially downwardly from the user input portion 224. Illustratively, the user input portion 224 comprises a handle blade or lever 225. Alternatively, the user input portion 224 may comprise a knob (not shown). The shaft 226 extends along a longitudinal axis 228 and includes a shoulder 230 defining a downwardly facing surface 232. An upper end 234 of shaft 226 is coupled to user input portion 224, while a lower end 236 of the shaft 226 includes D-shaped opening 38. In one illustrative embodiment, the handle 216 is integrally formed from a metal, such as a plated zinc alloy.

A hub 218 includes a side wall 244 defining an internal chamber 246 extending between open upper end 248 and an open lower end 250. In the illustrative embodiment, the side wall 244 is arcuate, and more particularly circular, in lateral cross-section. The open upper end 248 includes an upwardly facing surface 252. A lip 253 is formed in the internal chamber 246 and defines a downwardly fixing surface 254. An opening 255 extends between surfaces 252 and 254 for receiving shaft 226 of the handle 216. The shaft 226 is illustratively received within the open upper end 248 and axially restrained. by an upper coupler 256. In one illustrative embodiment, the hub 218 is integrally formed from a metal, such as a plated zinc alloy.

The upper coupler 256 of faucet handle assembly 210 illustratively includes push nut 57 as detailed above. More particularly, the push nut 57 is concentrically received on the lower end 236 of the shaft 226 to axially restrain the shaft 226 of the handle 216 while permitting rotation of the shaft 226 about longitudinal axis 228.

A glide ring 264 is illustratively positioned between the shoulder 230 of the handle 216 and the hub 218 to define an upper bearing 266 between upwardly facing surface 252 of the hub 218 and the downwardly facing surface 232 of the handle 216. The glide ring 264 is illustratively formed of a polymer, such as nylon.

A lower coupler 284 of faucet handle assembly 210 illustratively includes a. mounting base 222 including a side wall 292 supporting external threads 290. The external threads 290 are configured to threadably couple with internal threads 288 supported by the side wall 214 of the hub 218. The mounting base 222 is recessed within the internal chamber 246 of the hub 218. Similar to the hub 218, the mounting base 222 may be formed of a metal, such as a zinc alloy.

A gasket 344 is positioned axially intermediate the hub 218 and the mounting base 222, and extends radially around the mounting base 222. The gasket 344 is illustratively formed of a polymer and is configured to resist possible corrosion between the zinc of the hub 218 and the mounting deck 12. The gasket 344 includes a locating flange 346 extending upwardly from a base 348.

Although the invention has been described in detail with reference to certain preferred embodiments, variations and modifications exist within the spirit and scope of the invention as described and defined in the following claims.

The invention claimed is:

1. A faucet handle assembly comprising:
   a handle including a user input portion and a shaft extending downwardly along a longitudinal axis from the user input portion, the shaft including a shoulder defining a downwardly facing surface;
   a hub including a side wall defining an internal chamber extending between an open upper end and an open lower end, the open upper end including an upwardly facing surface, a lip within the internal chamber defining a downwardly facing surface, the shaft of the handle being received within the open upper end for rotation about the longitudinal axis, and opposing retainer tabs extending inwardly from the side wall into the internal chamber proximate the open lower end;
   a push nut to retain the shaft of the handle to the hub, the push nut including an upper surface and slidably adjustable along the shaft of the handle for axial positioning relative to the downwardly facing surface of the lip of the hub for accommodating tolerances between the handle and the hub, the upwardly and downwardly facing surfaces of the hub being captured between the downwardly facing surface of the shaft of the handle and the upper surface of the push nut;

an upper glide ring positioned intermediate the shaft of the handle and the hub to define an upper bearing between the downwardly facing surface of the shoulder of the handle and the upwardly facing surface of the upper end of the hub;

a lower glide ring positioned intermediate the hub and the push nut to define a lower bearing between the downwardly facing surface of the lip of the hub and the upper surface of the push nut; and a mounting base including a support defining a central opening and arms positioned outwardly from the central opening and defining rotational lock channels to receive the retainer tabs of the hub, the hub being in an unlocked position when the tabs are positioned outside of the channels, and the hub being in a locked position when the hub is rotated about the longitudinal axis from the unlocked position such that the tabs are received within the lock channels; and a valve body including an upper receiving member configured to receive a valve cartridge having a valve stem, and a mounting shank extending downwardly from the upper receiving member, the mounting shank including a retaining lip supported by an upper surface of the mounting base.

2. The faucet handle assembly of claim 1, wherein the mounting base includes first orientation flats and the mounting shank includes second orientation flats configured to cooperate with the first orientation flats to angularly orient the valve body to the mounting base.

3. The faucet handle assembly of claim 1, further comprising a mounting nut, wherein the mounting shank includes external threads, the mounting nut threadably coupled to the mounting shank to clamp a mounting deck between the mounting base and the mounting nut.

4. The faucet handle assembly of claim 1, wherein the shaft of the handle includes a D-shaped cross-sectional lower opening, and the valve stem has a D-shaped cross-section received within the lower opening of the shaft.

5. The faucet handle assembly of claim 1, wherein the mounting base is recessed within the internal chamber of the hub.

6. The faucet handle assembly of claim 5, further comprising a gasket positioned intermediate the hub and a mounting deck and around the mounting base.

7. The faucet handle assembly of claim 1, wherein the side wall of the hub has a rectangular cross-section.

8. A faucet handle assembly for coupling to a valve stem, the faucet handle assembly comprising:

a handle including a user input portion and a shaft extending downwardly from the user input portion, the shaft including a shoulder defining a downwardly facing surface;

a hub including a side wall having a rectangular cross-section and defining an internal chamber extending between an open upper end and an open lower end, the open upper end including an upwardly facing surface, the shaft of the handle being rotatably received within the open upper end, and a downwardly facing surface positioned within the internal chamber;

a push nut to retain the shaft to the hub, the push nut slidably adjustable along the shaft of the handle for axial positioning relative to the downwardly facing contact surface of the shoulder of the handle for accommodating tolerances between the handle and the hub;

a valve body including an upper receiving member configured to receive a valve cartridge having a valve stem, and a mounting shank extending downwardly from the upper receiving member;

a mounting base defining a central opening, the mounting shank of the valve body extending through the central opening;

a valve body orientation device to angularly orient the valve body relative to the mounting base;

a hub orientation device to angularly orient the hub relative to the mounting base; and a handle orientation device to angularly orient the user input portion of the handle in a single position relative to the valve stem.

9. The faucet handle assembly of claim 8, wherein the hub orientation device includes:

opposing retainer tabs extending inwardly from the side wall of the hub; and opposing arms positioned outwardly from the central opening of the mounting base and defining rotational lock channels to receive the retainer tabs of the hub, the hub being in an unlocked position when the tabs are positioned outside of the channels, and the hub being in a locked position when the hub is rotated about its longitudinal axis from the unlocked position such that the tabs are received within the lock channels.

10. The faucet handle assembly of claim 9, further comprising:

an upper glide ring positioned intermediate the shaft of the handle and the hub to define an upper bearing between the downwardly facing surface of the shoulder of the handle and the upwardly facing surface of the upper end of the hub; and a lower glide ring positioned intermediate the hub and the push nut to define a lower bearing between the downwardly facing surface of the hub and the push nut.

11. The faucet handle assembly of claim 9, wherein the valve body orientation device includes first orientation flats on the mounting base, and second orientation flats within the mounting shank and configured to cooperate with the first orientation flats rotationally locate the valve body relative to the mounting base.

12. The faucet handle assembly of claim 11, further comprising a mounting nut, wherein the mounting shank includes external threads, the mounting nut threadably coupled to the mounting shank to clamp a mounting deck between the mounting base and the mounting nut.

13. The faucet handle assembly of claim 11, wherein the handle orientation device includes a D-shaped cross-sectional lower opening in the shaft of the handle, and the valve stem has a D-shaped cross-section received within the lower opening of the shaft.

14. The faucet handle assembly of claim 8, wherein the mounting base is recessed within the internal chamber of the hub.

15. The faucet handle assembly of claim 14, further comprising a gasket positioned intermediate the hub and a mounting deck and around the mounting base.

16. A faucet handle assembly comprising:

a handle including a user input portion and a shaft extending axially downwardly from the user input portion, the shaft including a shoulder defining a downwardly facing surface;

a hub including a side wall defining an internal chamber extending between an open upper end and an open lower end, the open upper end including an upwardly facing surface, a lip within the internal chamber defining a downwardly facing surface, the shaft of the handle being received within the open upper end for rotation;

a push nut to retain the shaft of the handle to the hub, the push nut including an upper surface and slidably adjustable along the shaft of the handle for axial positioning relative to the downwardly facing surface of the lip of the hub for accommodating tolerances between the handle and the hub, the upwardly and downwardly facing surfaces of the hub captured between the downwardly facing surface of the shaft of the handle and the upper surface of the push nut;

a valve body including an upper receiving member configured to receive a valve cartridge having a valve stem, and a mounting shank extending downwardly from the upper receiving member and including a retaining lip; and a mounting base recessed within the chamber of the hub, the mounting base including a support defining a central opening and a coupler extending upwardly from the base and cooperating with an inner surface of the side wall of the hub to secure the hub to the mounting base, the retaining lip of the mounting shank supported by an upper surface of the mounting base.

17. The faucet handle assembly of claim 16, further comprising:

a valve body orientation device to angularly orient the valve body relative to the mounting base;

a hub orientation device to angularly orient the hub relative to the mounting base; and a handle orientation device to angularly orient the user input portion to the valve stem.

18. The faucet handle assembly of claim 17, wherein the hub orientation device includes:

opposing retainer tabs extending inwardly from the side wall of the hub; and opposing arms positioned outwardly from the central opening of the mounting base and defining rotational lock channels to receive the retainer tabs of the hub, the hub in an unlocked position when the tabs are positioned outside of the channels, and the hub in a locked position when the hub is rotated about the longitudinal axis such that the tabs are received within the lock channels.

19. The faucet handle assembly of claim 18, wherein the valve body orientation device includes first orientation flats on the mounting base, and second orientation flats within the mounting shank and configured to cooperate with the first orientation flats rotationally locate the valve body relative to the mounting base.

20. The faucet handle assembly of claim 19, further comprising a mounting nut, wherein the mounting shank includes external threads, the mounting nut threadably coupled to the mounting shank to clamp a mounting deck between the mounting base and the mounting nut.

21. The faucet handle assembly of claim 19, wherein the handle orientation device includes a D-shaped cross-sectional lower opening in the shaft of the handle, and the valve stem has a D-shaped cross-section received within the lower opening of the shaft.

* * * * *